United States Patent [19]

Pong et al.

[11] Patent Number: 4,958,068
[45] Date of Patent: Sep. 18, 1990

[54] DUAL BUMPER-LIGHT CURTAIN OBSTACLE DETECTION SENSOR

[75] Inventors: William Pong, Brookfield Center; Robert G. Stacy; Allen J. Bancroft, both of Danbury, all of Conn.

[73] Assignee: Transitions Research Corporation, Danbury, Conn.

[21] Appl. No.: 387,151

[22] Filed: Jul. 28, 1989

Related U.S. Application Data

[63] Continuation-in-part of Ser. No. 265,784, Nov. 1, 1988, and Ser. No. 307,765, Feb. 7, 1989.

[51] Int. Cl.$^5$ .................................................. G01V 9/04
[52] U.S. Cl. .................................... 250/222.1; 180/167
[58] Field of Search ................ 250/221, 222.1, 561; 180/167, 168; 901/47; 293/4; 340/555–557

[56] References Cited

U.S. PATENT DOCUMENTS

| | | | |
|---|---|---|---|
| 3,973,685 | 8/1976 | Loomer | 214/16 B |
| 4,137,984 | 2/1979 | Jennings | 180/168 |
| 4,228,886 | 10/1980 | Moran | 196/395 |
| 4,295,740 | 10/1981 | Sturges, Jr. | 356/152 |
| 4,309,696 | 1/1982 | Nagai et al. | 340/515 |
| 4,423,998 | 1/1984 | Inaba et al. | 250/222.1 |
| 4,489,578 | 12/1984 | Nagai et al. | 72/21 |
| 4,620,285 | 10/1986 | Perdue | 364/513 |
| 4,628,496 | 12/1986 | Lee | 367/93 |
| 4,638,445 | 1/1987 | Mattaboni | 364/513 |
| 4,651,074 | 3/1987 | Wise | 901/47 |
| 4,652,205 | 3/1987 | Ross et al. | 414/786 |
| 4,660,703 | 4/1987 | Filcich et al. | 192/130 |
| 4,668,859 | 5/1987 | Winterer | 250/221.1 |
| 4,695,156 | 9/1987 | Taft | 356/1 |
| 4,704,603 | 11/1987 | Edwards et al. | 340/674 |
| 4,829,174 | 5/1989 | Booth et al. | 250/222.1 |

*Primary Examiner*—David C. Nelms
*Attorney, Agent, or Firm*—Kramer, Brufsky & Cifelli

[57] ABSTRACT

An obstacle detection and position sensing system for autonomous mobile vehicles is described. The system includes two spaced-apart contact and position sensitive bumpers disposed across the frontal cross section of the vehicle. Light beams are directed by transceivers and retroreflectors across the frontal cross section area between the two bumpers, forming a light curtain. The combination of the bumpers and light curtain provides complete frontal coverage of the potential collision cross-section of a fairly large vehicle, without obstructing the field of view of sonar, optical, or other forward-looking sensors.

17 Claims, 4 Drawing Sheets

DUAL BUMPER-LIGHT CURTAIN OBSTACLE DETECTION SENSOR

CROSS REFERENCE TO RELATED APPLICATIONS

This is a continuation-in-part of U.S. patent application Ser. No. 265,784 entitled BUMPER FOR IMPACT DETECTION, filed on Nov. 1, 1988, and of U.S. patent application Ser. No. 307,765, entitled AUTONOMOUS VEHICLE FOR WORKING ON A SURFACE AND METHOD OF CONTROLLING SAME, filed on Feb. 7, 1989.

TECHNICAL FIELD OF THE INVENTION

The invention relates to autonomous mobile vehicles (robots) and, more particularly, to an obstacle detection and avoidance system for such a vehicle.

BACKGROUND OF THE INVENTION

Autonomous mobile vehicles (robots) have been designed to operate in indoor and outdoor environments. Two principal issues in vehicle guidance are: (1) general navigation within the environment; and (2) maneuvering around obstacles. With respect to the latter, a critical problem is the detection and collision avoidance of obstacles which unexpectedly lie in the path of the vehicle. The type and configuration of obstacles can occur in bewildering configurations which cannot be anticipated. In typical indoor environments, obstacles include humans, furniture, trash cans, carts, stock in store aisles, other vehicles and shelves.

Sensors used to detect such obstacles include sonar, contact sensitive bumpers, visual systems, infrared scanners, and laser ranging systems. Contact sensitive bumpers are simple and low cost but are cumbersome as a sole means of providing complete frontal coverage to detect all possible obstacles. Sonar offers longer range non-contact sensing, but many sensors are needed for full coverage, and sonar is subject to erroneous readings resulting primarily from the specular nature of sonar reflections. Multiple echoes give false "mirror" images. Smooth objects whose surfaces are not facing the sonar source reflect waves away from the receiver, rendering the obstacle invisible to sonar. Laser ranging systems offer the most complete and accurate sensing, but are too heavy, power consuming, and expensive for practical application to commercially viable mobile robots in cleaning or fetch and carry operations.

Generally, obstacles of concern may occur at any position in the frontal cross-section of the vehicle in its direction of travel. Overhanging shelves, posts, table or desk tops, hanging plants, stock on store shelves, and protruding poles may extend into the frontal cross-section. Complete coverage may be provided by putting a contact sensitive shell across the front of the entire vehicle. In that case, special holes would have to be cut as windows for the fields of view of forward looking sonar or vision.

DISCLOSURE OF THE INVENTION

It is one object of this invention to provide reliable obstacle detection over the complete vehicle frontal cross-section in the direction of travel.

It is a further object of the invention to provide reliable detection and position measurement of a wide variety of obstacle types and configurations.

It is yet another object of the invention to provide such complete coverage without obstructing the forward field of view of longer range sensors such as sonar and vision.

It is a yet further object of the invention to accomplish the aforementioned objectives using low cost equipment requiring little power and minimal mechanical complexity.

It is a yet further object of the invention to sense position of obstacles in the frontal cross-section and take appropriate action to maneuver around the obstacle or to use it as a reference in close approach skirting of the obstacle.

According to the invention, two contact and position sensitive bumpers are disposed at the upper and lower boundaries of the frontal cross-section of the robot in the direction of forward motion. A row of low-cost light transceivers is mounted along the underside of the upper bumper, and a row of retroreflectors is mounted along the top side of the lower bumper. The transmitter component of the transceiver transmits infrared light in a narrow beam to the retroflector directly beneath it. The light is reflected directly back to the receiver element of the transceiver. If an obstacle breaks the beam, the lateral position of that transceiver gives the lateral position of the obstacle. If an obstacle intrudes into the path of the vehicle higher or lower than the light curtain, it will make contact with the bumpers, which may also be position sensitive.

The sensed lateral position of the obstacle is used to command the vehicle to turn away from the obstacle. In some cases, for example in autonomous floor cleaning vehicles, it may be desirable for the vehicle to "hug" the edge of the obstacle. In this case, if an obstacle such as the overhanging edge of a table has intruded within the lateral-most position of the frontal cross-section, the vehicle may be maneuvered so as to maintain that positioning.

Other objects features and advantages of the invention will become apparent in light of the following description thereof.

DETAILED DESCRIPTION OF THE INVENTION

Figure 1:
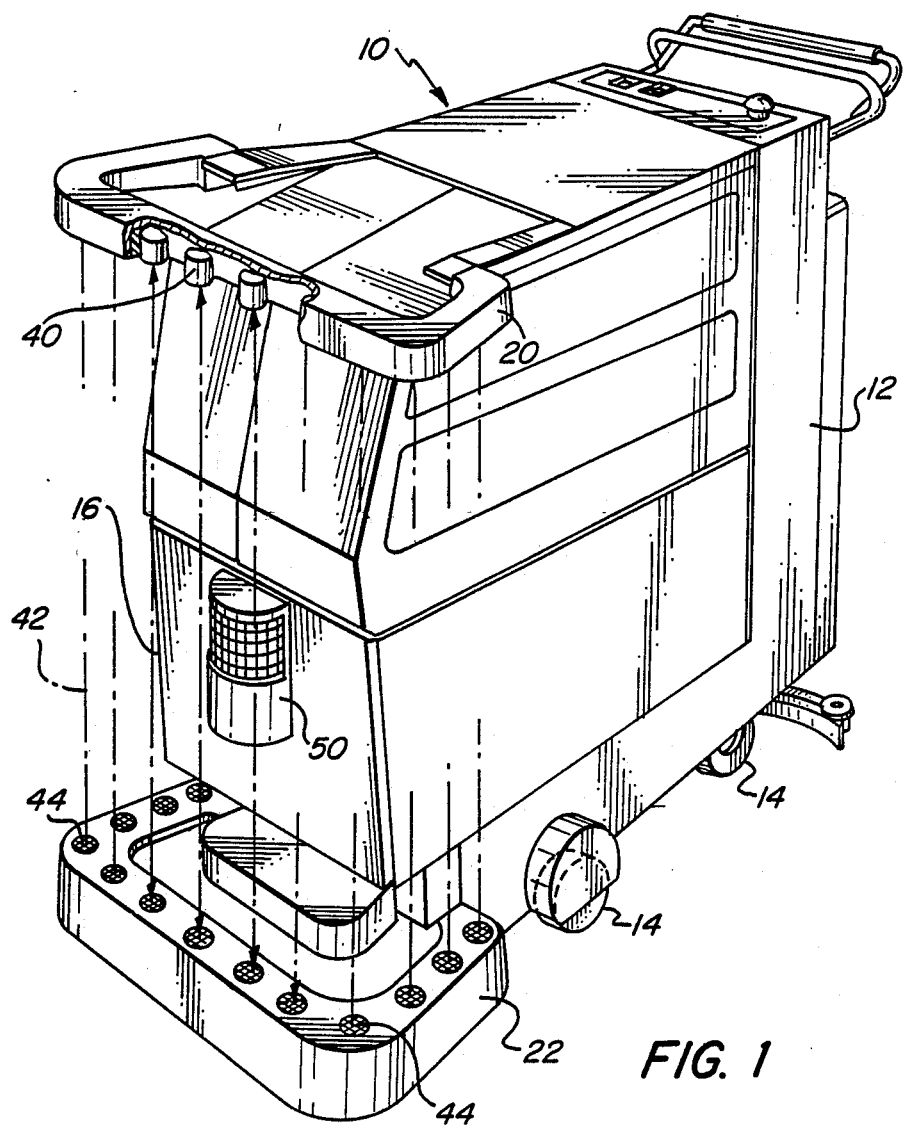
FIG. 1 is a perspective view of the autonomous mobile vehicle of the present invention.

FIG. 1 illustrates an autonomous mobile vehicle (robot), such as a floor cleaning machine 10. The vehicle 10 has a body 12 housing a cleaning system (e.g.) and a control system for the vehicle, and is supported by wheels 14 for movement about a floor surface. The vehicle has a front movement about a floor surface. The vehicle has a front surface 16 with a fairly large frontal cross-section. As used herein, "front" indicates the nominal direction of "forward" travel for the vehicle 10. It should be understood that the vehicle is able to turn and reverse direction.

An upper bumper 20 is mounted to the front of the housing 12, at a position at least as high as the highest parts of the vehicle. The bumper 20 is at least contact sensitive, in other words able to provide a signal to the control system indicative of contact with an obstacle (object in the path of the vehicle) encountered by the vehicle, and is preferably position sensitive, in other words able to provide information in the signal to the control system indicative of the position of contact with the obstacle. Various implementations of the bumper 20 are discussed hereinafter. Any obstacle whose position is high enough to escape sensing by passing over the upper bumper will pass over the vehicle (i.e., the vehicle will pass under the obstacle).

A lower bumper 22 is mounted to the front of the housing 12, preferably at as low a position as possible with respect to the vehicle (recognizing, of course, that the lower bumper should not drag on the floor surface). The lower bumper 20 is at least contact sensitive, in other words, able to provide a signal to the control system indicative of contact with an obstacle (object in the path of the vehicle) encountered by the vehicle, and is preferably position sensitive, in other words, able to provide information in the signal to the control system indicative of the position of contact with the obstacle. Various implementations of the bumper 22 are discussed hereinafter. Thus, any potential obstacle resting on the floor surface, no matter how small, will be sensed by the lower bumper.

As illustrated in FIG. 1, both the upper and lower bumpers 20 and 22 are generally C-shaped, extending outwardly (laterally) from either side of the vehicle in proximity to the front surface thereof, forwardly in front of the housing, and (laterally) across the frontal cross-section (profile) of the vehicle. The bumpers extend laterally out from the sides of the vehicle to just exceed the width of the vehicle. Their surfaces curl around the side/front corners of the vehicle to permit lateral collision detection during turns, and to provide lateral contact detection for paths which hug the boundary of an obstacle, such as a wall.

As mentioned hereinbefore, the bumpers 20 and 22 are at least contact sensitive, in other words able to sense collision with an obstacle. Suitable contact sensitive bumpers are known to include pneumatic tubes disposed along the length of the bumper, microswitches or Tapeswitches disposed along the length of the bumper, and a rigid bumper with switches or force sensitive resistors at the mounting points thereof. A suitable pneumatic arrangement for detecting contact along the length of a pneumatic tube is disclosed in U.S. Pat. No. 4,669,597, entitled ESCALATOR SKIRT PANEL DEFLECTION SWITCH. However, such a pneumatic arrangement is not well suited to position detection. Tapeswitches or an array of microswitches would provide position detection. More effective would be a simple contact/position sensitive bumper employing electrically conductive foam described in commonly-owned, copending U.S. patent application Ser. No. 322,345, entitled TETHER-GUIDED VEHICLE AND METHOD OF CONTROLLING SAME, filed on Mar. 13, 1989 and incorporated by reference herein.

As mentioned hereinbefore, the bumpers 20 and 22 are preferably position sensitive, in addition to contact (force) sensitive. In other words, the bumpers 20 and 22 are able to provide signals to a control system indicative of the position of contact with an obstacle with regard to the vehicle.

Figure 2:
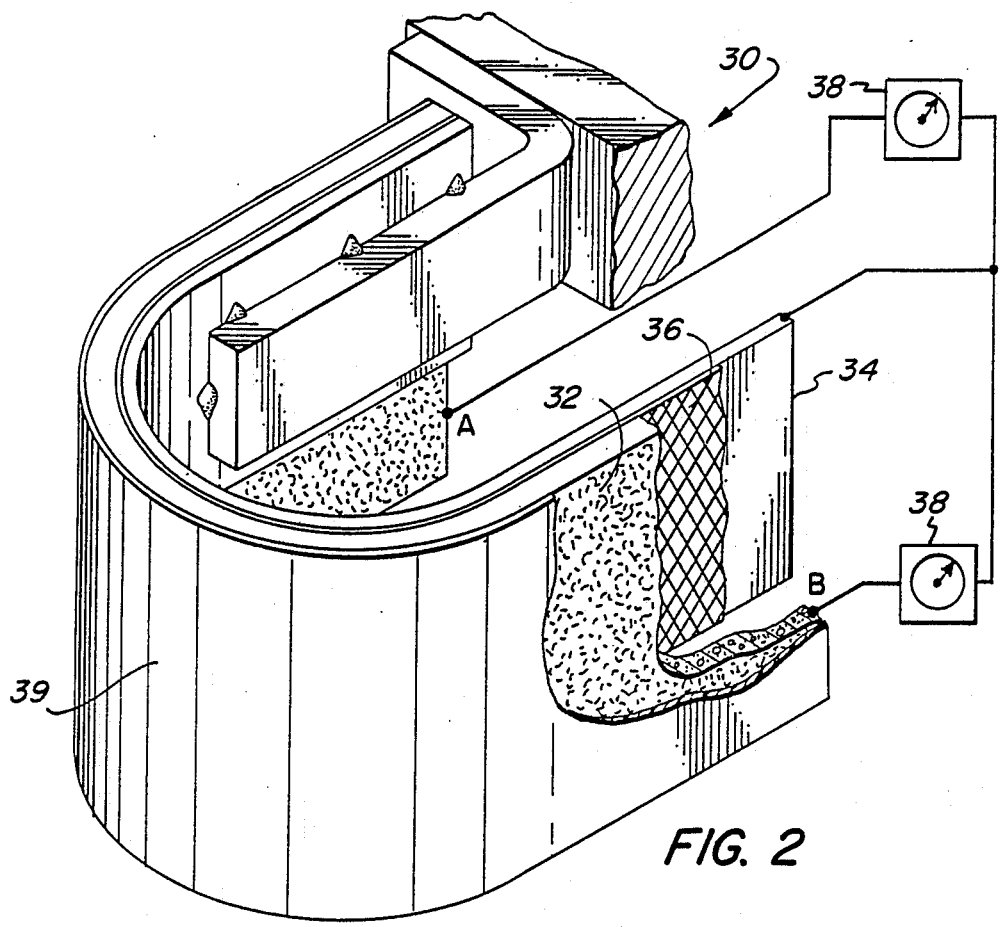
FIG. 2 is a perspective schematic view of a bumper for the vehicle of FIG. 1.
Figure 3:
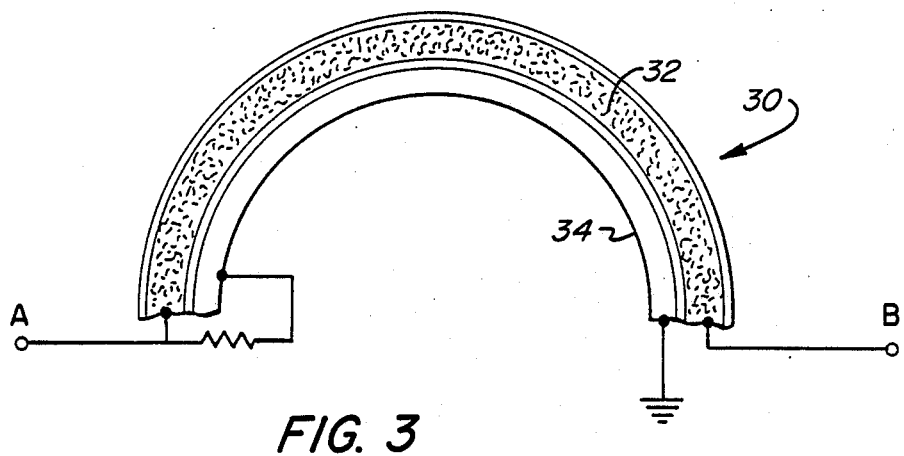
FIG. 3 is a schematic view of a bumper for the vehicle of FIG. 1.

FIGS. 2 and 3 illustrate a contact and position sensitive bumper 30 suitable for use as the upper and lower bumpers 20 and 22, respectively. A compliant layer of conductive foam 32, having a discernable resistance, is separated from a highly conductive plate 34 by an insulating mesh 36. Upon contact with an object (obstacle) in the environment, the foam 32 squeezes through the mesh 36 and makes contact at a contact point with the conductive plate 34. A voltage divider is thereby formed, as indicated by the meters 38, and both contact force and contact position can be determined. In other words, the electrical circuit across the foam measures resistance, which is related to compression of the foam. The location and degree of compression of the foam can be computed from the resistance.

Preferably, the bumper 30 is provided with an exterior covering 39 of tough plastic sheet. Mechanically, the foam 32 provides compliance to soften collisions, while the covering sheet 39 protects the foam from damage. Electrically, compressing the foam decreases its resistance.

As shown in FIG. 3, the foam acts as a voltage divider in a circuit between sandwiching conductive layers. The resulting voltage, measured across terminals A and B, is directly related to the position of compression. The force of compression may also be measured by resulting electrical parameter values in the circuit. This is useful for force-sensitive navigation servoing. For example, the vehicle could maintain light lateral bumper contact with a wall, table rim, or other bounding feature, to clean a floor as close to such object as possible.

A more detailed description of the bumper 30 is found in commonly-owned, copending U.S. patent application Ser. No. 265,784, entitled BUMPER FOR IMPACT DETECTION, filed on Nov. 1, 1988 and incorporated by reference herein.

As discussed hereinbefore, overhanging shelves, posts, hanging plants, and protruding poles may extend into the frontal cross-section of the vehicle. It is evident that such obstacles would elude detection by the bumpers 20 and 22. Therefore, a "light curtain" is created in the frontal area between the bumpers, as discussed hereinafter.

Figure 4:
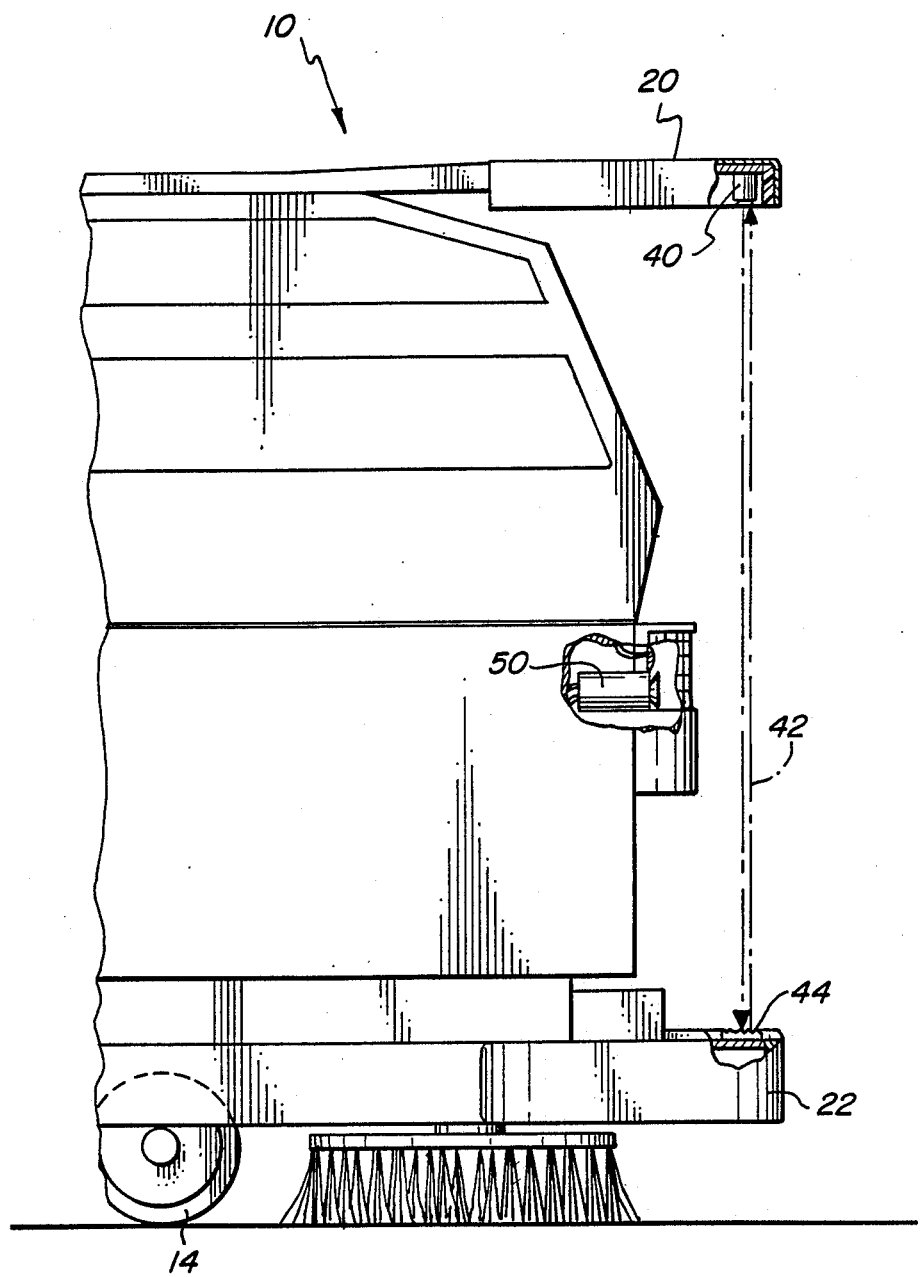
FIG. 4 is a partial side view, partially cutaway, of the vehicle of FIG. 1.

With reference to FIGS. 1 and 4, a row (array, set) of infrared transceivers 40 are disposed recessed within the upper bumper 20, along the length thereof, in a manner allowing the transceivers to emit beams 42 of light from the upper bumper 20 to the lower bumper 22.

Each transceiver includes a narrow beam, preferably infrared light source co-aligned with a light responsive receiver. The transceivers are arrayed along the underside of the bumper, aiming downward to a corresponding position on the lower bumper.

A row (array, set) of retroreflectors 44 are disposed on the upper surface of the lower bumper 22, at positions corresponding to the location of the transceivers, to reflect the beams of light emitted by the transmitter component of the transceivers back to the receiver component of the transceivers. In this manner, retroreflectors reflect a beam of light from a back to the corresponding receiver.

There is a one-to-one correspondence between the number of transceivers and the number of retroreflectors, and they are disposed in alignment with each other so as to create a "curtain" of light spanning the frontal area between the upper and lower bumpers. For example, thirteen transceivers 40 are disposed on the upper bumper 20 to emit (and receive reflected) thirteen beams 42 towards the lower bumper. When any of these beams are interrupted by an obstacle, the associated transceiver provides a signal indicative of the position of the obstacle intrusion with respect to the vehicle to the vehicle control system for corrective, such as evasive, maneuvering.

Hence, in a straightforward manner, the known position of the transceiver signaling an interruption to the control system provides information indicative of the position of the obstacle with respect to the forward direction of travel of the vehicle.

The control system interprets signals caused by interruption of light beams or contact with the bumpers, in order to guide the vehicle responsively to causative obstacles. The control system is discussed in greater detail with respect to FIG. 5, hereinafter.

While thirteen transceivers, and hence thirteen retroreflectors, are illustrated, more or fewer may be provided as dictated by the frontal area desired to be covered and the positional resolution of obstacle detection.

For example, approximately seven transceivers 40 may be evenly-spaced in an array spanning thirty inches (laterally) across the front beam of the upper bumper 20. This would yield about 5 inch spacing between transceivers (and hence the beams) across the front of the vehicle. Three more units 40 are mounted on each of the lateral curls of the upper bumper at similar spacing. Thus, any obstacle wider than 5 inches would be thus assured of breaking the light beam. Narrower obstacles could conceivably penetrate between two beams without being detected, if properly aligned and positioned. In environments where such obstacles are likely, for example a sports store which sells javelins which are poking out from storage bins, tighter spacing could be provided by increasing the number, and hence decreasing the space, of the transceivers. Five inch spacing provides reliable detection of the limbs of a human body and most reasonable obstacles, such as furniture, and fixtures.

Each transceiver consists of a transmitter-receiver pair. These units require little power, are low-cost, and provide no human detectable illumination. A suitable transceiver is available from Banner Engineering Corporation of Minneapolis, Minn. (Model #SM312LVAG) and has a power consumption of 25 milliwatts.

The transceivers preferably operate in the infrared range, such as at a wavelength of 880 nanometers. This beam is advantageously modulated to eliminate spurious detection of extraneous sources, such as the reflection of ceiling lights in puddles on the floor, or sunlight on the lower bumper. The receiver demodulates its input to screen out non-modulated sources. Reflections from specular objects, such as stainless steel or glass shelves, intruding within the beam may undesirably return light to the sensor as if it were returning from the retroreflector, falsely signaling the absence of obstacles. This is avoided in the aforementioned Banner transceiver SM312LVAG by a polarizing filter over the transmitter. The plane of polarization is rotated 90° by a corner cube type retroreflector such as the Banner BRT-3. The detector is equipped with a polarizing filter whose plane is also rotated 90° with respect to the transmitted beam. Reflections from specular surfaces such as glass or stainless steel do not rotate the plane of polarization 90°, but leave it unchanged. Thus, the corner cube is seen by the detector, but specular objects are not.

It is within the scope of this invention that an array of light sources are disposed on one of the bumpers for emitting light beams, and that an array of light receivers are disposed on the other of the bumpers for receiving the light beams. However, it is preferred to use transceivers disposed on one of the bumpers and retroreflectors disposed on the other of the bumpers.

As illustrated in FIGS. 1 and 4, the transceivers are recessed beneath the upper bumper to protect them from collision, pointing down to the lower bumper. The same light curtain effect could be achieved by mounting the transceivers on the lower bumper, pointing upward, but the upper mounting is preferable because it puts these electrical components further away from splashing fluids and dirt which may be associated with the floor cleaning heads which are mounted directly behind and under the lower bumper.

As shown in FIGS. 1 and 4, the retroreflectors are preferably mounted recessed, directly below and in alignment with the transceiver unit. They preferably consist of corner-cube reflector plastic disks whose diameter is about 1.5". Such retroreflectors are available from Banner Engineering Corporation (Model #BRT-3) for use with its transceiver units (mentioned hereinbefore). The retroreflectors are preferably rugged, passive optical elements whose reflective efficiency is not seriously impaired by drops of splashed cleaning liquids, scratches, or dust.

The bumpers 20 and 22 are mounted on a frame which extends slightly ahead of the vehicle so that the vehicle has time to stop soon after intrusions of obstacles into the light curtain, without collision with the vehicle housing.

Hence, it is apparent that the dual bumper/light curtain arrangement disclosed herein provides full frontal coverage for obstacle detection. While full frontal coverage may be achieved by other means, such as by putting a contact sensitive shell across the front of the entire vehicle, in that case, special holes would have to be cut in the shell as windows for the fields of view of forward looking sonar, vision or laser devices.

A distinct benefit of the dual bumper/light curtain arrangement described herein is that the front surface of the vehicle is "open". Hence, not only is full coverage provided, but there is no impediment to providing a forward-looking sensor such as a sonar, laser or vision device. Hence, as illustrated in FIGS. 1 and 4, the front surface of the vehicle 10 is provided with a forward looking sonar, laser or vision device 50, with respect to any of which the light curtain is effectively transparent.

Such forward looking sonar, laser and vision devices (sensors) are able to look ahead of the vehicle, detecting obstacles prior to contact therewith. Such information, provided as signals to the control system, is useful for path planning and navigation registration with the environment in the neighborhood of the vehicle. The high and low mounting of the bumpers offers a completely open field of view for these forward-looking sensors.

A description of a navigation system to which the obstacle sensing system of the present invention would be advantageously employed, is described in commonly-owned, copending U.S. patent application Ser. No. 307,765 entitled AUTONOMOUS VEHICLE FOR WORKING ON A SURFACE AND METHOD OF CONTROLLING SAME, filed on Feb. 7, 1989 and incorporated by reference herein.

It is significant to observe for efficiency and reliability that the bumpers contain no articulated parts and consume very little power (less than one watt). It is also significant that the response speed of the sensors are virtually instantaneous, providing quick response to collision in the case of the bumper, and to collision avoidance in the case of the light curtain. The update rate of the sensors is very fast (in the kilohertz range), permitting use of the sensor signals for stable responsive servo control of the vehicle.

Figure 5:
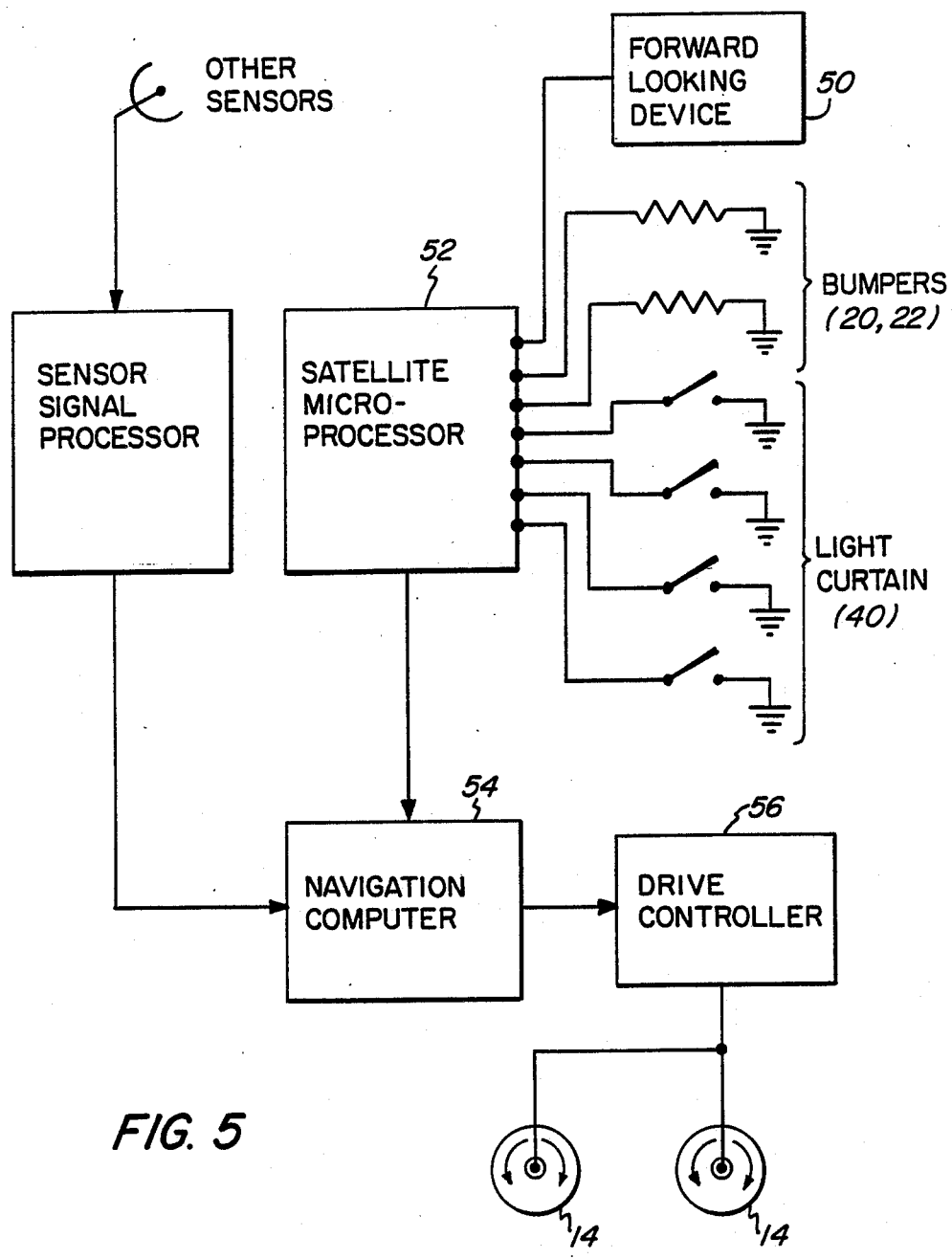
FIG. 5 is a schematic of a control system for the vehicle of FIG. 1.

FIG. 5 is a system block diagram of the autonomous vehicle control system. A satellite microprocessor system 52 with electrical inputs from the bumpers 20,22 and transceivers (light curtain) 40, monitors position and force sensing data from the bumpers, and light curtain interruption data from the transceivers. Signals from the forward looking device 50 (sonar, laser or vision) is also monitored. This information is passed on to a navigation computer 54 which responds by commanding the vehicle drives to stop, turn, or other appropriate response. Vehicle motion is supervised by a drive controller 56 directing (via motors, encoders and the like) the motion of the vehicle wheels 14. Other sensors, shown for completeness, provide signals through a Sensor Signal Processor to the Navigation Computer for other, unassociated functions.

The mission of the autonomous vehicle may be to clean floors (note the brush attachment shown in FIG. 4), or to carry a payload to a destination, or other task. While it is in motion, the forward-looking device 50 is scanning the environment ahead for obstacles. If an obstacle comes within the space between the two bumpers, it interrupts the light reflected back to the transceiver unit. The result is a change in output voltage which is signaled to the microprocessor 52. The identity of the unit corresponds to the position of the obstacle. Similarly, contact with either of the bumpers results in a resistance change which signals the microprocessor. The navigation computer incorporates this information into its local model of the environment in the neighborhood of the vehicle. Depending on its program, it may stop the vehicle, turn away from the obstacle, or servo to maintain a path which maintains close contact with the sensed feature in a "skirting" path.

What is claimed is:

1. Obstacle detection system for an autonomous mobile vehicle comprising:
   a first bumper disposed laterally across the frontal cross section of the vehicle;
   a second bumper, spaced from the first bumper, and disposed laterally across the frontal cross section of the vehicle; and
   an array of light sources disposed on the vehicle for emitting a curtain of light beams between the first and second bumpers;
   an array of light receivers disposed on the vehicle for receiving the light beams, said light receivers providing an indication of the position of an object intruding between the first and second bumpers towards the vehicle.

2. Apparatus as claimed in claim 1, wherein:
   the array of light sources are disposed on the first bumper;
   the array of light receivers are disposed on one of the first or second bumpers.

3. Apparatus according to claim 1, wherein:
   the array of light sources are disposed on the first bumper; and
   the array of light receivers are disposed on the first bumper with respective light sources; and further comprising:
   an array of retroreflectors disposed on the second bumper in positions for reflecting the light beams from a particular light source to a particular light receiver.

4. Apparatus according to claim 3, wherein:
   the light receivers are co-aligned with respective light sources.

5. Apparatus according to claim 4, wherein:
   each light source is related to a respective light receiver in a transceiver.

6. Apparatus according to claim 1, wherein the light sources are light emitting diodes.

7. Apparatus according to claim 1, wherein the light sources are modulated.

8. Apparatus according to claim 7, wherein the light receivers are demodulated.

9. Apparatus according to claim 3, wherein the retroreflectors are corner-cube reflectors.

10. Apparatus according to claim 3, further comprising:
    first polarizing means, associated with the retroflectors, for rotating the plane of polarization of the light beams; and
    second polarizing means, associated with the receivers, rotating the plane of polarization of the reflected light beams.

11. Apparatus according to claim 1, further comprising:
    a forward looking sensor mounted to the vehicle and directed through the light curtain to sense objects ahead of the vehicle.

12. Apparatus according to claim 11, wherein the forward looking sensor is a sonar device.

13. Apparatus according to claim 11, wherein the forward looking sensor is a laser device.

14. Apparatus according to claim 11, wherein the forward looking sensor is a vision device.

15. A method of controlling an autonomous vehicle in an environment containing obstacles comprising:
    sensing contact with obstacles with two spaced-apart bumpers;
    sensing intrusion of an object into an area between the two bumpers with a light curtain.

16. A method according to claim 15, further comprising:
    sensing objects in the environment ahead of the vehicle with a forward looking device.

17. A method according to claim 16, wherein the forward looking device is directed through the light curtain.

* * * * *